United States Patent [19]

Grajewski

[11] Patent Number: 4,593,371

[45] Date of Patent: Jun. 3, 1986

[54] X-RAY TUBE EMISSION CURRENT CONTROLLER

[75] Inventor: John P. Grajewski, Palmyra, Wis.

[73] Assignee: General Electric Company, Schenectady, N.Y.

[21] Appl. No.: 550,825

[22] Filed: Nov. 14, 1983

[51] Int. Cl.[4] ........................ G01D 18/00; H05G 1/44; G12B 13/00

[52] U.S. Cl. ................................ 364/571; 250/252.1; 364/550; 378/108; 378/207

[58] Field of Search ..................... 250/252.1; 364/550, 364/551, 571; 378/108, 109, 110, 112, 111, 116, 207

[56] References Cited

U.S. PATENT DOCUMENTS

| | | | |
|---|---|---|---|
| 4,072,865 | 2/1978 | Craig et al. | 378/110 |
| 4,097,793 | 6/1978 | Shapiro et al. | 378/207 X |
| 4,158,138 | 6/1979 | Hellstrom | 378/116 |
| 4,160,906 | 7/1979 | Daniels et al. | 378/116 X |
| 4,481,654 | 11/1984 | Daniels et al. | 378/112 X |
| 4,482,918 | 11/1984 | Keyes et al. | 378/99 X |

*Primary Examiner*—Errol A. Krass
*Assistant Examiner*—Edward R. Cosimano
*Attorney, Agent, or Firm*—Fuller, House & Hohenfeldt

[57] ABSTRACT

Digital values representing trial bias voltages that are to be applied to the control grid of an x-ray tube are stored at respective locations in a battery energized RAM. The addresses of the locations correspond to the nominal x-ray tube currents that relate to the bias voltages. A model of the actual bias voltages for selected tube currents is made and supplants the trial voltages. A trial digital bias value is converted to an analog signal used to control the output level of a generator that applies the bias voltage to the grid. An x-ray exposure is made. The x-ray dosage in terms of actual milliampere-seconds (mAS) is measured and compared with a reference desired mAS value. A computer calculates to a first approximation the bias voltage that should have been applied to obtain the desired mAS and returns the new digital bias voltage value to the same location. The process is repeated for each of a range of tube currents until actual and desired mAS agree at which time the corrected bias voltages are stored. When later the x-ray system is used for patient exposures, operator selection of tube mA level brings about automatic application of the proper bias voltage for the particular tube.

7 Claims, 7 Drawing Figures

X-RAY TUBE EMISSION CURRENT CONTROLLER

BACKGROUND OF THE INVENTION

The invention disclosed herein is for assuring that the current flowing through an x-ray tube during an x-ray exposure corresponds with the current that has been selected by the x-ray technician or other operator.

As is well known, the current flowing between the target (anode) and the filament (cathode) of an x-ray tube depends mainly on the electron emissivity of the filament and to some extent on the kilovoltage (kV) that is applied to the anode. Emissivity is a function of filament temperature. In some systems, the voltage applied across the filament is varied to thereby change filament temperature, and, hence, emissivity. Such systems do not allow making closely consecutive x-ray exposures at different x-ray tube current levels (mA) because of the thermal lag of the filament; that is, the filament temperature does not change instantaneously with a change in applied voltage. Thus, it would be practically impossible to make one x-ray exposure at one tube current level and follow it with an exposure at another markedly different level in 30 milliseconds (ms), for example. It should be noted also that x-ray apparatus manufacturers calibrate the current control before the system is turned over to the user since there is a nonlinear relationship between filament temperature and tube current and anode voltage as well and it has taken time and skill to perform the calibration.

Closely consecutive x-ray exposures at markedly different tube currents or milliamperages (mA) can be achieved by using an x-ray tube that is equipped with a control grid. The user is typically required to actuate some x-ray tube current selection control which brings about a change in the negative bias voltage applied to the grid and, hence, the mA flowing through the tube. The usual bias voltage range is zero to minus 3,000 volts on the grid with respect to the filament. When grid bias voltage control is used, the x-ray tube filament current and filament temperature can be set at a fixed value since mA is controlled mainly by the grid bias voltage. Thus, the thermal lag problem is avoided and closely successive exposures at different currents can be made because the current response of the tube to bias voltage changes is substantially instantaneous.

When the filament temperature is held constant, the tube is operating in the emission limited mode. Tube mA can also be affected by space charge near the filament and by the anode-to-cathode kV at various grid bias voltages. Hence, x-ray apparatus manufacturers calibrate their tube current controls to apply a grid bias voltage that will yield the selected x-ray tube mA at many anode-to-cathode kilovoltages when the apparatus is installed for the user. The conventional calibration process involves iterative adjustment or trimming of a large number of potentiometers to obtain the various analog signals for creating the proper grid bias voltage in relation to selected x-ray tube mA and kV. Calibration of an analog signal control system requires a substantial amount of time which is obviously disadvantageous.

A further disadvantage is that the calibration applies only to the particular x-ray tube that is in the diagnostic x-ray apparatus at the time of calibration. Although x-ray tubes are manufactured to very close tolerances, tubes made on the same production line and having the same nominal ratings will have slightly different operating characteristics so there can be no universally applicable calibrating protocol. That is, tubes even of supposedly the same type can have a variable and rather unpredictable relationship between selected mA, grid bias voltage and applied kV. It should be evident that if an x-ray tube has to be replaced with a comparable tube in any diagnostic x-ray apparatus, the laborious calibrating procedure must be repeated on the user's premises where calibration involves setting the levels of many analog signals in accordance with the prior art method mentioned above.

Hybrid digital subtraction angiography (HDSA) is an x-ray diagnostic procedure that requires an accurate and reproducible relationship between the bias voltage that is applied to the control grid and the electron emission current in an x-ray tube. In the HDSA procedure an alternating series of low kV-high mA and high kV-low mA x-ray exposure pairs are made of a region in a body that contains the blood vessel of interest. A high x-ray energy exposure in a pair is made one or two television frame times after the low energy exposure, for example, 30 ms or 60 ms apart to reduce the likelihood of body movement between exposures. The first sequence of exposures are made before an x-ray opaque medium such as an iodinated compound, reaches the region of interest. The data representative of the x-ray images are stored. The exposure sequence continues over an interval during which an injected opaque medium reaches the vessel of interest, increases to maximum concentration and decreases to low or zero concentration. All the image data are stored. In one of the hybrid data processing procedures, the low x-ray energy exposures and high energy exposures are summed and weighted and the summations are combined to bring about cancellation of soft tissue in the region of interest, and let data representative of the image of the opaque medium filled blood vessels remain. More information on HDSA can be found in Keyes et al, application Ser. No. 371,683 filed Apr. 26, 1982, now U.S. Pat. No. 4,482,918 dated Nov. 13, 1984 which is assigned to the assignee of this application.

The patent just cited illustrates a case where x-ray exposures are made with low kV on the anode of the x-ray tube in combination with high mA flowing through the tube (called low energy exposures) alternating with exposures made with higher kV on the anode and the lower mA (called high energy exposures). For digital subtraction angiography it is especially important to obtain and maintain tube currents during high energy exposures that correlate with tube currents and anode kV's used for the low energy exposures. One reason is that it is desirable to have substantially the same x-ray dosage or milliroentgens for the low energy exposures as for the high energy exposures.

SUMMARY OF THE INVENTION

An objective of the invention disclosed herein is to provide means for determining and storing a unique model of the various bias voltages which must be applied to the control grid of an x-ray tube in order to obtain a desired x-ray tube current or mA while a certain kilovoltage or kV is being applied between the anode and the electronemissive cathode of the tube. In other words, the objective is to determine the control grid negative bias voltages that will yield the desired x-ray tube current uniquely for the particular tube in a given diagnostic system to thereby account for the inevitable differences in operating characteristics between x-ray tubes, even tubes produced by the same manufacturer that are constructed of the same materials, supposedly have the same geometry, the same tolerances, the same functions and the same ratings.

A feature of the invention is that the apparatus user simply has to select the tube mA desired for a contemplated x-ray exposure or sequence of exposures and can be assured that the proper specific grid bias voltage will be applied automatically.

Another significant feature of the invention is that the data representative of the grid bias voltage versus x-ray tube mA model is stored in a read/write memory (RAM) that is nonvolatile in that it has battery backup so if the x-ray system loses electric power, even for a great length of time, the model information will be retained and ready for use when power is restored.

Another objective of the invention is to make it easy to recalibrate or develop a new model of the grid bias voltages if a tube is replaced and make it easy to calibrate periodically and rapidly, perhaps every six months or so, if the tube is subjected to heavy duty, to account for the effects of tube aging and degradation on the relationship between tube currents and corresponding grid bias voltages. A correlative of this object is to obviate the need for iterative adjustment of a multitude of potentiometers and a corresponding number of exposure tests that have been required in prior art analog bias voltage generating systems before a tube was put into service or when a failed tube was replaced by a new one.

The embodiment of the invention herein described facilitates performing digital subtraction angiography, especially hybrid digital substraction and angiography where a sequence of low kV-high mA (low energy) and alternating high kV-lower mA (high energy), x-ray exposures are made and the time between each exposure pair is very short such as 30 to 90 ms or the elapsed time of 1, 2 or 3 television camera frame times.

In accordance with the invention, a prerequisite for setting up and storing the grid bias voltage versus x-ray tube mA model is to pre-ordain a table of the high kV and related low mA combinations that it is desired to use with each or a representative number of the low kV, high mA combinations, respectively. To develop the grid bias voltage model for the particular x-ray tube, the service person, using known operator controls, selects a low kV, high mA combination. In the illustrated embodiment which contemplates hybrid angiography, the high kV is always the same, 130 kV for example, although the lower mA values used with the single high kV are variable. A microprocessor based central processing unit (CPU) accesses a battery backed nonvolatile RAM for a 16-bit digital number, which could be almost any number that has been programmed into the RAM at the factory and which at least roughly corresponds to the bias voltage that ought to be applied to the grid to get the proper tube mA when the switch is made to high kV. This arbitrary digital value is converted to an analog signal which is input to a bias voltage generator which outputs a grid bias voltage proportional to the analog input signal. Meanwhile in the model generating procedure, the CPU using the desired mA level in the table for the fixed high kV calculates the exposure time required to produce a standard milliamperesecond (MAS) x-ray dosage. The standard value may be ten or twenty MAS, for example, although other values that are close to dosages used in regular patient exposures could be used. Assume, for example, that the mA at 130 kV should be 100 mA corresponding to a low kV and high mA of 60 kV and 250 mA, respectively. The calculated exposure time (t) at 100 mA to obtain the standard 10 MAS product would be $100 \text{ mA} \times t = 10$ MAS or exposure time, t, equals 0.1 second or 100 milliseconds and the exposure time is set for this time.

An exposure is then made and the mAS actually resulting is displayed to the service person setting up the model. The actual mAS may be under or over 10 mAS on the first exposure trial. If it is over the standard, for example, it means that the current flowing through the tube was too high for the trial bias voltage value. In any event, the CPU is programmed to determine the amount and direction by which the actual mAS differs from the standard value and the CPU calculates a new 16-bit trial value that should reduce the differential to nearer to zero. The new trial value is stored in RAM and again fed to the bias voltage generator in analog form. Another exposure is made. The mAS error may be closer to zero. Assume that by the fourth trial at least the error is no greater than 3%, the CPU will then store the 16-bit number proportional to grid bias voltage in the battery backup RAM as the bias voltage appropriate to a low kV of 60 and related 250 mA in order to assure 100 mA at 130 kV on the x-ray tube anode. This process is repeated for each of a number of permissible mA values at different low kV values such as 60, 70, 80 and 90 kV and the table or model of bias voltages is built up and stored in nonvolatile RAM.

In actual embodiment, 248 bias voltages form the model, corresponding to the 248 possible combinations selected by the end user. However, the service person need only set up 48 points. Therefore, the service person need only press the x-ray switch about 150 times to create the model. More importantly, he does not have to guess at correction factors as he needed to in previous methods of model development.

After the model has been developed, the x-ray apparatus can be turned over to the user for regular clinical use. When the user desires to run a hybrid digital subtraction angiography series, it is only necessary for the user to select, by way of an operator's console, a high mA and low kV combination that is required for imaging the blood vessel containing the anatomy of interest. Then, every time the system switches for the high kV exposure, the proper 16-bit word representative of the proper bias voltage for obtaining the appropriate mA at the higher kV will be accessed by the CPU, converted to an analog signal value and applied to the bias voltage generator synchronously with the high kV.

The manner in which the foregoing and other specific objectives are achieved will become evident in the ensuing more specific description of an embodiment of the invention which will now be set forth in reference to the drawings.

DESCRIPTION OF THE DRAWINGS

FIG. 7 is a computer flow chart for one cycle of the model developing operation.

DESCRIPTION OF A PREFERRED EMBODIMENT

Figure 1:
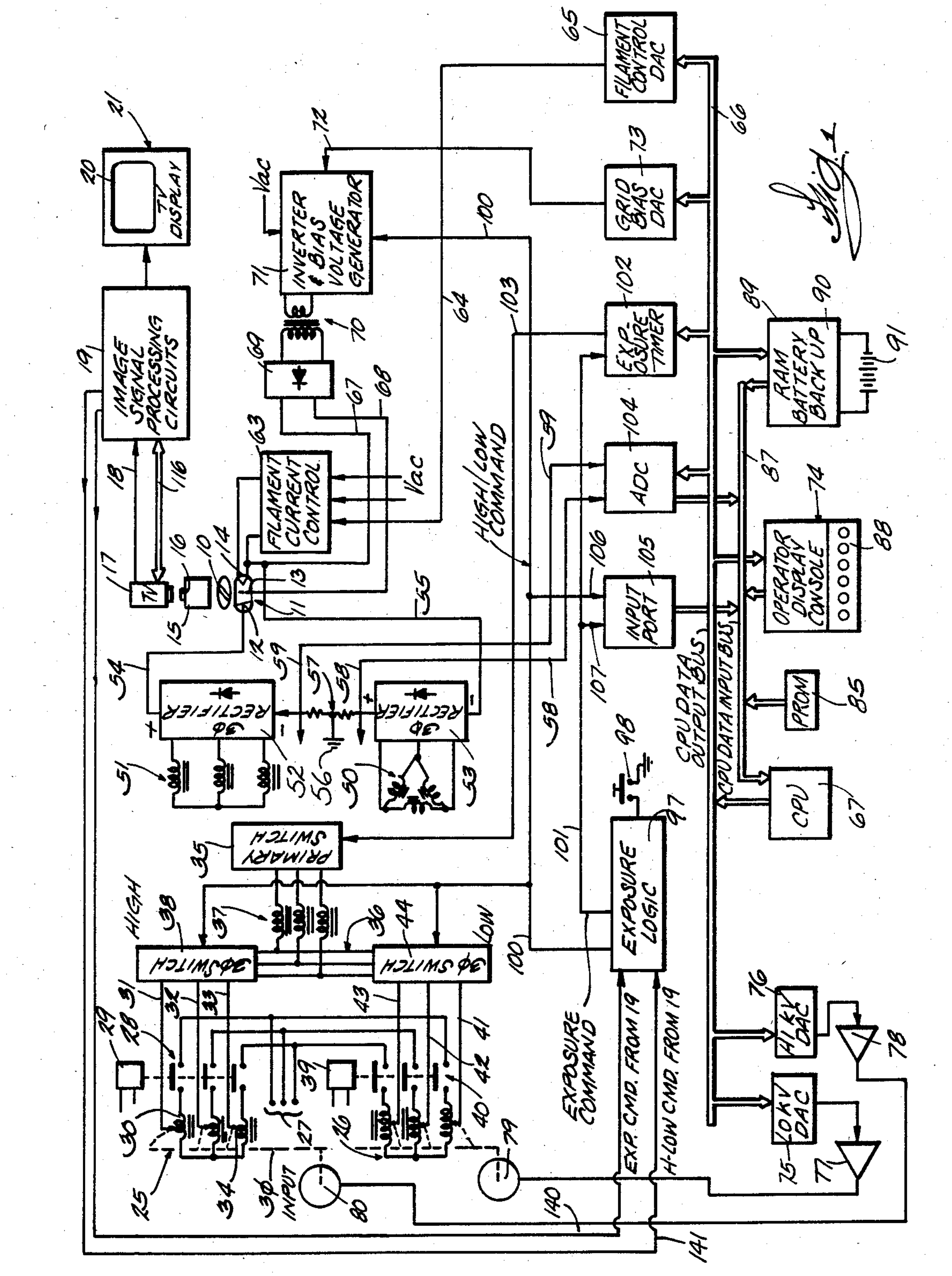
FIG. 1 is a partially schematic and partially block diagram of a diagnostic x-ray system in which the devices for developing an x-ray grid bias voltage versus x-ray tube current model are employed.

The FIG. 1 block diagram provides an overview of the main components of an x-ray system that is adapted to, among other things, perform hybrid digital subtraction angiography. The block diagram is sufficient to demonstrate development and use of a grid bias voltage model.

In the upper center region of FIG. 1, the patient who is to undergo an angiographic examination is represented by the ellipse marked 10. The x-ray tube under the patient is generally designated by the number 11. The x-ray tube is comprised of an anode 12, a control grid 13 and an electron emissive filament or cathode 14. Low and high energy x-ray beams are alternately projected through the patient and are received in an electronic x-ray image intensifier 15 which converts the x-ray images to bright and minified optical images which are formed on a phosphor 16 in the intensifier. A television (TV) camera 17 converts the optical images to analog video signals which are transferred by a line 18 to an image signal processing circuit block 19 where the signals are processed to ultimately produce a hybrid image that will appear on the screen 20 of a television monitor 21. The signals representative of the hybrid image may also be recorded on magnetic disk, not shown, for future TV display. A more comprehensive description of the TV chain and signal processing circuitry for producing and displaying hybrid subtraction images may be seen in the above cited Keyes et al application. The matter of present interest is to show how an x-ray tube grid bias voltage model can be developed and used in a system that generates closely successive alternate low and high energy x-ray beams.

The x-ray tube high voltage power supply shown in FIG. 1 is one shown and described in detail in a copending application of Daniels et al, Ser. No. 417,715, filed Sept. 9, 1982, now U.S. Pat. No. 4,481,654, dated Nov. 6, 1984, and assigned to the assignee of this application. The power supply includes two 3-phase variable autotransformers 25 and 26. Autotransformers identified by General Electric Company trademark "Voltpac" are suitable. The 3-phase lines constituting the input to the power supply from the 60 Hz power lines are labeled 3-phase input and are marked 27. Typically the input voltage is 480 volts ac. Autotransformer 25 is active when high energy or high kilovoltage is to be applied to the x-ray tube anode. Autotransformer 26 is active and autotransformer 25 is inactive during low energy exposures as when low kilovoltage is applied to the x-ray tube. The power lines connected to the input of the autotransformer windings have in them three safety contacts 28 which are controlled by a solenoid 29 that is energized to close the contacts when an x-ray exposure sequence is contemplated. The three autotransformer windings are designated generally by the reference numeral 25. The 3-phase output lines from autotransformer 25 are marked 31, 32 and 33. A typical tap switch for selecting the desired output voltage from the autotransformer secondary winding is marked 34. The three tap switches are ganged so the voltages between phases remain in balance. The output 31, 32 and 33 are input to a 3-phase switching circuit that is symbolized by the block marked 35. This switching circuit can be implemented using silicon controlled rectifiers (SCRs), not shown, as switching devices by anyone reasonably skilled in the x-ray power supply art. In any event, the switches control power on a 3-phase bus 36 to which the 3-phase primary windings of a Y-connectable transformer primary 37 are connected. The primary windings 37 are magnetically coupled to the secondary windings 50 and 51 of the stepup transformer. Transformer primary windings 37 are connected to the autotransformer 25 output lines by means of a 3-phase switch that is symbolized by the block marked 38. This switching circuit may also be comprised of SCRs that are switched to a conductive or closed state in response to receiving a switching signal as will be described. Thus, if safety contacts 28 are closed and 3-phase switch 38 is rendered conductive, the primary windings 37 of the high voltage transformer will be energized from autotransformer 25 in which case a certain low voltage determined by the setting of the autotransformers, is applied to the primary winding 37 of the stepup transformer. Of course, simultaneously, primary switch 35 is rendered conductive to connect the center point of the Y-connectable primary windings 37 together.

The other autotransformer arrangement 26 in FIG. 1 is also supplied from the 3-phase input when line contactor solenoid 39 is energized to close its three contacts 40. The output lines 41, 42 and 43 from 3-phase autotransformer 26 are input to a 3-phase SCR switching circuit 44 which is similar to switch 38. Autotransformer 26 provides on its output line 41–43 3-phase voltage that is lower than the voltage that is provided by the other autotransformer 25 on its output lines 31–33. Switching circuit 44 connects the windings of the transformer primary 37 to autotransformer 26 in response to receiving suitable gating or triggering signals as will be explained. In this particular design, when an alternating low and high energy exposure sequence is initiated, the 3-phase switches in switching circuit 44 become conductive and apply the lower of the two autotransformer output voltages to stepup transformer primary windings 37. Shortly thereafter, for the next high energy exposure, the switches in switching circuit 38 are rendered conductive to energize primary windings 37 from autotransformer 25 so the higher of the two voltages is applied to the primary windings 37 of the 3-phase transformer.

There are two high kilovoltage secondary windings 50 and 51 on the same iron core as primary winding 37. The set of secondary windings 51 are connected in the Y-configuration as shown. The other secondary winding 50 is Delta-connected. The Delta-connected secondary output kilovoltage on the lines leading from the Delta-connected secondary windings 50 are 30° out of phase with the output lines of the Y-connected secondary windings 51. The 3-phase output lines of the Delta-connected secondary 50 are input to a 3-phase rectifier circuit symbolized by the block marked 53. The 3-phase output lines from the Y-connected secondary windings 51 are input to another 3-phase rectifier circuit symbolized by the block marked 52. The two rectifier circuits 52 and 53 are in a series circuit with the x-ray tube 11. The positive terminal of the rectifier circuit connects to the anode 12 of the x-ray tube by way of a line 54. The negative terminal of the rectifier circuit connects to the cathode or filament 14 of the x-ray tube by way of a line 55. There is a resistor network 57 in the series circuit which conducts the x-ray tube current during tube energization and the voltage drop across this resistor network is a signal that is proportional to x-ray tube current and this signal appears across lines 58 and 59. The mid-point of the resistor network is grounded as at 56. The use that is made of the signal proportional to x-ray tube current will be described later. The arrowheaded lines leading from the terminals of resistor network 57 are for suggesting that the same signal proportional to tube current can be used for operating an overload protective device, not shown.

Both high voltage transformer secondary windings 50 and 51 are energized at any time that the primary windings are energized with either the lower or the higher of the two primary voltages available from the respective autotransformers 26 and 25. The fact that the Y-connected and Delta-connected 3-phase secondary windings 51 and 50 are 30° out of phase with each other results in twelve 60 Hz ripples being present on the top of each x-ray tube current pulse. Thus, the x-ray tube voltage and current pulses approximate square waves.

The cathode-to-anode electron emission current flowing through the x-ray tube 11 during an exposure is governed by the filament current control which is represented by the block marked 63. The details of the filament current control need not be described since any of several types of current controls known to those skilled in the x-ray apparatus art can be used. The purpose of the control is to set the level of the current that is flowing through the filament 14 of the x-ray tube, and, hence, filament temperature and electron emissivity. For present purposes, assume that the filament current control contains an isolating transformer, not shown, which has a saturable reactor, not shown, in its primary circuit. As is well known, varying an analog control signal to the saturable reactor varies the impedance of the reactor so it can bring about a variation in the voltage applied to the primary of the filament transformer. The analog control signal is supplied to filament current control 63 by way of a line 64 that is the output line from a digital to analog converter (DAC) represented by the block marked 65. The digital input to DAC 65 is coupled to the output data bus 66 of a microprocessor based central processing unit (CPU) that is represented by the block marked 67. It is sufficient for present purposes to point out that when the user selects a particular x-ray tube current or an ordinary fluorographic or hybrid digital subtraction angiography technique, CPU 67 will provide a digital signal on its output data bus 66 corresponding in value to the selected x-ray tube current. This signal is converted in DAC 65 to a corresponding analog signal which is fed by way of line 64 to the filament control. A system for producing digital signals that are converted to analog signals for controlling filament current and other exposure parameters is described in Daniels et al, U.S. Pat. No. 4,160,906, dated July 10, 1979 and assigned to the assignee of the present application.

The invention involves determining and automatically applying the proper negative bias voltage to the control grid 13 of x-ray tube 11 for obtaining a predictable and reproducible x-ray tube current at whatever voltage is applied between the anode 12 and cathode 14 of the x-ray tube during an exposure. The apparatus for generating the bias voltage used herein is of a known type described in the copending application of Daniels et al, Ser. No. 417,715 filed Sept. 9, 1982 now U.S. Pat. No. 4,481,654, dated Nov. 26, 1984. For present purposes, it is sufficient to recognize that the bias voltage on the x-ray tube is applied between control grid 13 and filament 14 by way of a pair of lines 67 and 68 which are output from a full-wave rectifier represented by the block marked 69. The input to rectifier 69 is from the secondary winding of a transformer 70 whose primary winding is connected to the output of a block marked 71 and labeled inverter and bias voltage generator. Basically, this is simply a dc-to-ac inverter that responds to an analog signal on one of its inputs 72 by varying its ac output signal to transformer 70 to thereby set the bias voltage on control grid 13. Control line 72 is connected to the output of a grid bias DAC represented by the block marked 73. The input to grid bias DAC 73 is coupled by way of a bus to the CPU data output bus 66. The digital input signals to DAC 73, supplied by CPU 67, fall into two classes, one of which pertains to setting up the model of grid bias voltage versus x-ray tube current by a service person and the other of which pertains to applying the proper grid bias voltage during x-ray exposures by the ultimate user of the system.

The kilovoltage applied between anode 12 and cathode 14 of the x-ray tube 11 for actual fluography and for, in in accordance with the invention, setting up the model of x-ray tube grid bias voltage versus x-ray tube current are basically the same. High and low anode kV is selected by the user before an exposure is initiated or by the service person setting up the model by operating suitable switches or keys on an operator's console represented by the block marked 74. CPU 67 is programmed to respond to the selection by putting digital words corresponding to the selected low and high anode kilovoltages on CPU data output bus 66. The two digital words are sequenced at the proper time to the inputs of respective DACs 75 and 76 which output corresponding analog signals to analog signal amplifiers 77 and 78 whose outputs connect to servo amplifiers 79 and 80 which, as indicated by the dashed lines, move the sliders on the autotransformers 25 and 26 to the positions that result in a corresponding 3-phase voltage being supplied to 3-phase steering switches 38 and 44. In the actual apparatus, there are some ports, latches and decoders interposed between the inputs of DACs 75 and 76 and CPU data output bus 66 but they are not shown in FIG. 1 since simply showing that the autotransformers are adjustable to produce different low and high kilovoltages for the anode of the x-ray tube is sufficient for present purposes.

Actual selection of the transformer primary voltage is done with 3-phase switches 38 and 44 in response to a logic high or low command signal on line 100. When line 100 is at logic "0", variable autotransformer 26 is connected to the high voltage transformer primary 37 to apply the proper primary voltage for the low energy x-ray exposure before the exposure actually occurs. The actual exposure is started by the primary switch 35 in response to a signal on a line 103 from an exposure interval timer 102. The exposure timer 102 will be discussed in more detail later. When line 100 is at a logic "1" level, variable transformer 25 is connected to the high voltage transformer primary 37 to apply the proper primary voltage for the high energy exposure before the actual exposure. The actual exposure is started by a logic signal on line 103. A complete explanation of the kilovoltage selecting system is given in previously cited U.S. Pat. No. 4,160,906.

In the FIG. 1 system, all functions are basically under the control of CPU 67 whose instructions are stored in a programmable read-only memory (PROM) represented by the block marked 85. The CPU address bus which addresses various digital devices in the system is not shown. The CPU data input bus is marked 87. A display that will indicate to the user and to the service person setting up the model of x-ray tube grid bias voltage and tube current is represented by the block marked 88. A read/write or random access memory (RAM) 89 is coupled to CPU data output and input busses 66 and 87 and, of course, to the CPU address bus. RAM 89 is made nonvolatile by being provided with a battery backup circuit 90 of known design and this circuit is supplied by a battery 91. The battery backup circuit responds to loss of power line voltage by connecting battery 91 to the supply terminals of the RAM to thereby preserve any data that is stored in RAM 89. For reasons which will appear later when setting up a model of x-ray tube current versus the grid bias voltage is discussed, data is entered into RAM 89 at the factory before the apparatus is shipped out although it could be entered by the service person who is getting the diagnostic system in condition for turning it over to the ultimate user. While the service person is developing the grid bias voltage model at installation, the high/low command line 100 is set continuously at a high level. The service person controls the exposure commands on line 101 by using a switch 98 which is affiliated with an exposure logic circuit represented by the block marked 97. When the system is in clinical use, the high/low command line 100 and the exposure command line 101 are controlled by the image signal processing circuits 19 as will be discussed more fully later in reference to the FIG. 6 timing diagrams. Output line 100 from exposure logic circuit 97 also runs to the inverter and bias voltage generator 71. A low energy command signal from exposure logic circuit 97 to bias voltage generator 71 simply turns off the bias generator so that a bias voltage value of zero is applied to control grid 13 of the x-ray tube during each low energy or low kV exposure. When the quickly following high energy or high kilovoltage command signal is issued by exposure logic circuit 97, the bias voltage generator 71 causes a control grid 13 bias voltage to be developed that depends on the digital input, and, hence, the analog output signal from grid bias DAC 73 which controls the bias voltage generator 71 to produce an x-ray tube grid bias voltage that results in an x-ray tube current that is predetermined by the grid bias versus x-ray tube current model which has been previously developed as will be explained subsequently. The exposure logic circuit 97 is also involved in setting up the model which will be evident later.

The other previously mentioned line 101 leading out of the exposure logic circuit 97 is also labeled exposure command. This line leads to the exposure timer 102 which turns on in response to an exposure command by way of line 101 and turns off the exposure in response to whatever digital signal representative of exposure time is provided to its input from CPU data output bus 66. The exposure timer 102 need not be described in detail since a variety of such timers are available and are well known to those skilled in the art. In any event, after an exposure command activates the timer, it will produce a signal on its output line 103 that connects to transformer primary controlling switch 35 and switches the primary switch to an open circuit state, thereby terminating the x-ray exposure.

There is another analog-to-digital converter (ADC) 104 having ports coupled, respectively, to CPU data output bus 66 and input bus 87. The function of ADC 104 will be described later primarily in connection with developing the grid bias voltage model. As has been explained earlier, there are two input lines 58 and 59 to ADC 104 which supply the ADC with an analog signal that is proportional to x-ray tube current and is the voltage drop across resistor network 57. A data input port represented by the block marked 105 in FIG. 1 is the only circuitry that has not been described in general terms up to the present. The output of input port 105 is coupled by way of a bus to CPU data input bus 87. Input port 105 is shown to have two input lines 106 and 107 which connect respectively to the high/low command signal line 100 and exposure command signal line 101. The function of this port will be described later.

Now to be described is the manner in which the invention solves the problems resulting from the x-ray tube current increasing with increasing kilovoltage being applied to the anode of the x-ray tube even though the temperature of the x-ray tube filament is held constant and resulting from the nonlinear relationship between control grid bias voltage and x-ray tube current at a particular kilovoltage among x-ray tubes of the same nominal type. As indicated earlier, the program or instructions for setting up the model are stored in a PROM 85. Assume first, for the sake of example, that the x-ray physicists have previously determined for the purpose of conducting hybrid digital subtraction angiography what the x-ray tube current should be during the high kilovoltage or high energy x-ray pulses for related low energy or low kilovoltage and higher current x-ray pulses of various levels. Basically, an effort is made to get the low energy pulse roentgens or dosage to match the high energy dosage during each pulse. In the FIG. 1 circuit, as previously mentioned, during the low energy x-ray pulses zero bias voltage is applied to the control grid 13 of the x-ray tube and the tube is operated in the emission limited mode. For the high energy or high kV exposures, it remains to be determined what the negative grid bias voltage should be on the x-ray tube to get the desired current to flow through it. In the present example, assume that all high energy exposures are made with a specific high kV applied to the x-ray tube anode such as 130 kV. Assume further that the x-ray physicists have determined the desired relationships between low mA-high kV and high mA-low kV in accordance with the following table which is exemplary rather than exclusive:

TABLE I

HIGH ENERGY mA vs. LOW ENERGY mA, kV

| 1<br>Low Energy<br>mA | 2<br>Low Energy Exp. kV<br>60-70 | 3<br><br>71-80 | 4<br><br>81-90 |
|---|---|---|---|
| 250 | 100 | 100 | 125 |
| 320 | 125 | 125 | 160 |

TABLE I-continued

HIGH ENERGY mA vs. LOW ENERGY mA, kV

| 1 | 2 | 3 | 4 |
|---|---|---|---|
| Low Energy | Low Energy Exp. kV | | |
| mA | 60-70 | 71-80 | 81-90 |
| 400 | 160 | 160 | 200 |
| 500 | 200 | 200 | 250 |
| 640 | 250 | 250 | 320 |
| 800 | 320 | 320 | 400 |
| 1000 | 400 | 400 | 400 |
| 1250 | 400 | 400 | 500 |

Figure 2:
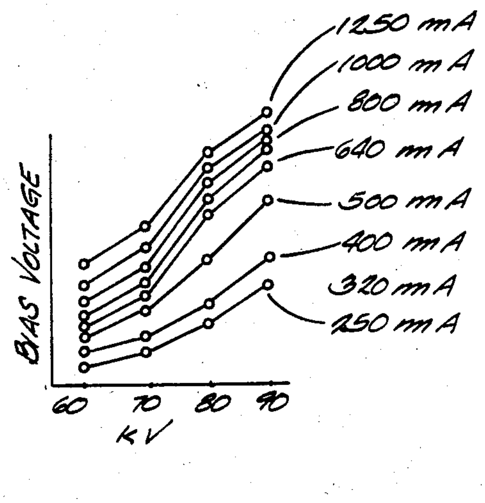
FIG. 2 shows, for a hybrid digital subtraction angiography procedure, if the user selects any in a range of low x-ray tube anode kilovoltages and any in a range of related x-ray tube currents or mA levels, a particular negative bias voltage must be applied to the control grid of the tube to obtain a predetermined x-ray tube current at high anode kV, said bias voltages constituting the model developed in accordance with the invention.

FIG. 2 is, in a sense, a graph illustrative of the results achievable with the invention. In this plot, the abscissa corresponds to the low kV levels applied to the x-ray tube and the ordinate represents the bias voltage that has to be applied to the control grid of the x-ray tube to obtain an x-ray tube current corresponding to the value in the table at the high kilovoltage. The individual lines in FIG. 2 labeled 250 through 1250 correspond to the low mA stations. One may see that the bias voltage is nonlinear and must be established to account for the differences in the functional characteristics of each x-ray tube.

Although the numbers given in the table are realistic, the purpose of using specific numerical values is to make describing how the grid bias voltage model is set up more understandable as is invariably the case when concrete numbers are used. In the table, column 1 lists eight different low energy mA values ranging from 250 to 1250 mA. These pertain to setting up the model. In actual clinical use of the x-ray system, many more current levels within the range of 250 to 1250 mA are allowed. The service person setting up the model will use one of the mA values at a time.

Column 2 is headed by 60–70 which are two low kV values or low energy values. The list of numbers in column 2 are mA values that should be obtained during the high energy exposures. For instance, if for a hybrid exposure sequence a low energy exposure at 250 mA were selected as from column 1 and a related low kV of 60 kV were selected as in column 2, then the x-ray tube current during the high energy exposures in the sequence should be 100 mA as indicated in column 2. Columns 3 and 4 each list other high energy exposure mA values for two other low kV values at various low energy mA values. Thus, in this example it will be evident that the service person making the model will want to determine and store the bias voltage values that will produce the desired x-ray tube mA when high kV is used corresponding to the 8 listed low energy mA values at 6 different low kV values, that is, at 60, 70, 71, 80, 81 and 90 kV, making a total of 6 times 8 or 48 bias voltage points.

Referring to FIG. 1 again, the first step that the service person takes in connection with setting up the grid bias voltage model data is to inform the system through the operator console 74 to switch into the mode for setting up the model. Next, the service person would set the filament current control 63 to produce, for example, 250 mA which is the low mA in the top of column 1 in table I. The service person also sets the low kV at, for example, 60 kV selected from the column 2 in the table. At 60 kV, it is desired to have 100 mA flowing through the x-ray tube when the high kV is being applied to the anode of the x-ray tube when the user is using it. In any event, the 250 low mA and 60 kV are nothing more than addresses to RAM 89 in which some arbitrary trial values of grid bias voltage have been previously stored. These trial values are in terms of 16-bit digital numbers which may be put in RAM 89 at the factory or at the installation site. Now, as has not been previously explained, when the system is switched to the bias voltage model setup mode, the CPU sets the system so that all exposures are made during development of the model at 10 milliampere-seconds (mAS). So, if the CPU is supplied with an mA value, it will calculate the exposure duration that is necessary to bring about a milliampere-seconds product equal to 10 mA. The calculated time value is in terms of a digital number that is supplied to the exposure timer 102 to bring about termination of the exposure in the calculated number of milli-seconds to get a 10 mAS exposure.

It should be noted that in the model setup mode, the high/low command on line 100 in FIG. 1 is continuously high. Thus, the actual kV applied to the x-ray tube anode during the model development exposures is some fixed high kV value corresponding to a suitable high kV for hybrid subtraction angiography later by the system user such as 130 kV. In this example, the high kV is 130 kV and the actual desired mA values at high kV are listed in columns 2, 3 and 4 of table I. Thus, in the model setup mode, the low mA and low kV selection merely identifies and selects the proper high mA station whose bias voltage to get the desired mA at high kV is to be determined.

Now to set up the model, the objective is to provide a grid bias voltage at every kV value so that the emission current is constant with respect to kV. In order to do this, the operator selects the first high mA station as described above. The CPU loads the 16-bit trial grid bias voltage data from the location in battery backup RAM 89 which corresponds to this high mA station into the grid bias DAC 73. This 16-bit digital number is converted to an analog signal, as previously explained, and the analog signal is fed by way of line 72 to the bias voltage generator 71 such that an arbitrary bias voltage results and is applied to control grid 13 of the x-ray tube. The CPU also loads the exposure timer 102 with a time which is equal to, for example, a standard value such as 10 mAS divided by the desired mA which, in the first step, would be 100 mA at 130 kV. Next, the operator makes an x-ray exposure using the hand switch 98. The ADC 104, which measures tube current by way of resistor network 57 during an exposure, produces a digital value proportional to mAS during exposure. CPU 67 reads this mAS value and displays the value to the service person on display 74.

Referring to the flow chart in FIG. 7, zone A, the CPU determines whether the service person has selected one of the 48 points in table I. If one of the 48 was not selected, set up is not possible. A valid low kV must be reselected. If a valid kV is selected, the CPU reads the actual mAS (zone B) and converts it to binary (zone C). The CPU then loads the desired mAS (zone D) which is 10 mAS in this example. The CPU then calculates the absolute value of the difference between the actual mAS and the desired mAS (zone E, FIG. 7). It multiplies this value by a scale factor (zone F) and it shifts and saves the scale value (zone G). Next, CPU 67 determines whether the measured mAS is greater than or less than the desired 10 mAS (zone H). If the measured mAS is less than the desired, the result of the previous multiplication, the scale value, is subtracted from the original 16-bit grid voltage trial value in the location corresponding to the selected kV and mA in RAM 89 (zone I); this value is clamped at zero, if necessary (zone J). The original trial grid data is now replaced by the corrected data and the grid bias DAC 73 is reloaded with this data (zone K). If the measured mAS is greater than the desired mAS, the result of the previous multiplication is added to the original trial grid voltage data in the RAM 89 location corresponding to the selected kV and mA (zone L); this value is clamped to 4095, if necessary (zone M). This original trial grid bias voltage data is now replaced in the RAM 89 by the corrected data, and the grid bias DAC 73 is loaded with this data (zone K). The above procedure is repeated. Each time the absolute value of the difference between the actual mAS and the desired mAS is less. The algorithmn stored in the PROM 85 that governs these calculations recognizes them as being complete when the absolute value of the difference is within specification, typically within about 3% of the desired mAS. The digital data represented by the grid bias voltage corresponding to the desired mAS is then stored in a RAM location corresponding to the selected low kV-high mA values that constitute the address to the bias voltage data in RAM 89 that will bring about 100 milliamperes when, in actual use, a switch is made to 130 kV on the anode of the x-ray tube. By referring to table I, one may see that to complete the bias voltage table in battery backup RAM 89 the service person, referring to table I, will set all of the low mA values in the column 1 with one kV value such as 60 or 70 in the next column and run the exposures which will result in obtaining the eight different milliamperages at the high kvp that are listed under 60–70 in column 2. The table provides eight low mA values and six different low kV values so that 48 points or 38 specific bias voltages will be developed the data representing grid bias voltage required to produce eight different x-ray tube mA values which later, when the system is in clinical use, will be provided when the switch to the high energy or high kV on the anode of the x-ray tube is made and while the corresponding low kilovoltage for the exposure pair is in the range of 60 to 90 kV in this example. One may see that there are two points for each 10 kV steps, and 3 steps per selectable low energy mA station.

The reason for 2 points for each 10 kV steps is to allow for the different high mA values at the same low mA value. For example, at the low energy mA setting of 250 mA, the high energy mA is 100 mA if the low kV is between 71 and 80 kV. However, the high mA is 125 if the low kV is between 81 and 90 kV. Therefore, independent set points are needed at 80 kV and 81 kV. The high energy mA is selected from a table now in RAM based on selection of the low kV and corresponding related high mA value to thereby obtain a total of six points per low mA station. There are 8 low mA stations for a total of 48 points as previously described for the entire bias voltage model.

Now the system can be switched out of the mode for setting up the grid bias voltages at 130 kV versus selectable low kV-high mA combinations. The data in FIG. 2, are, of course, applicable to the particular x-ray tube installed in the system. If an x-ray tube is replaced a new model must be set up because different grid bias voltages are very likely to be required for producing the same tube mA at 130 kV as was obtainable with the original tube.

After the model is complete, the system can be turned over to the user for operation. The high/low command on line 100 is then controlled by the image system processing circuits 19. When the user desires to make a low energy and high energy rapidly successive exposure sequence for a hybrid digital subtraction angiography procedure, the user simply selects the desired high mA-low kV combination with the current and voltage controls that are provided and have been described. The filament electron emission current corresponding to the selected mA will result from the filament current control 63 applying a certain voltage to the filament. As previously mentioned, the grid bias voltage during low kV-high mA exposures is held at zero since the filament is emission limited at low kV. During the low kV exposure, CPU 67 provides a digital input signal to DAC 73 which results in the bias voltage generator being blanked so there is no negative voltage applied to control grid 13. On the other hand, when the switch is made to apply high kV to the x-ray tube anode, CPU 67 addresses RAM 89 to retrieve the proper stored grid bias voltage data that will be provided to grid bias DAC 73 for bringing about development of the proper grid bias voltage for producing the desired x-ray tube current at the higher x-ray tube anode kV. A typical exposure sequence will be elaborated later in reference to the FIG. 6 timing diagram.

During user operation of the system, the tube mA measuring ADC 104 is not used. In the actual system, a line that controls writing in battery backup RAM 89 is also disabled to prevent obliterating the model bias voltage data that are stored in RAM 89.

In actual operation, the user may select any one of a large number such as 248 high mA-low kV points. If the user selects a point which is not one of the 48 points in this example that have been definitely recorded in RAM 89, the CPU is controlled by its algorithmn to make a linear interpolation to calculate the intermediate point.

In an actual embodiment, the RAM 89 is implemented with CMOS elements which draw very little power from the backup battery 91. In the actual system there is a powerdown detector on the battery RAM board that removes a chip enable signal from the CMOS RAM when the system power is turned off. The battery 91 backup for the RAM provides a minimum of 2 volts which guarantee that the data in RAM will not be modified when the power is off.

Figure 3:
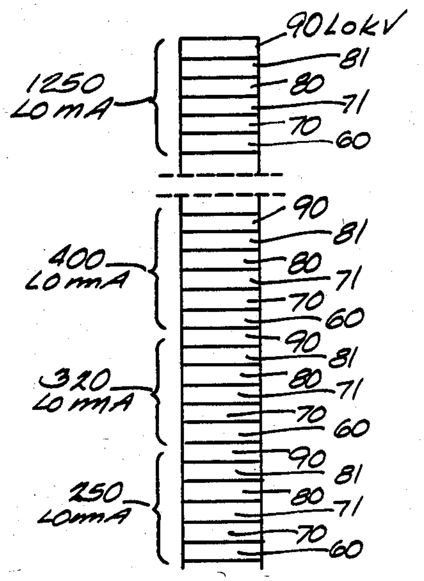
FIG. 3 is a memory map of the grid bias voltage model.

FIG. 3 is a partial memory map of the battery backup RAM 89. The values given are just for the sake of illustrating the invention with concrete numbers. FIG. 3 is a summation of the grid bias voltage model. For every low mA station, such as the 1250 mA station, there is a 12-bit value for each of the 6 kilovoltages used in this example which value is proportional to the grid bias voltage. The resolution of the grid bias voltage control is 1 part in 4096.

Earlier, in connection with describing development of the x-ray tube mA versus control grid bias voltage table, it was explained that ADC 104 converted an analog signal (proportional to the x-ray tube current flowing through resistor 57) to a digital signal used to calculate the grid bias DAC 73 level. ADC 104 is elaborated in FIG. 4 and its timing diagram is given in FIG. 5.

Figure 4:
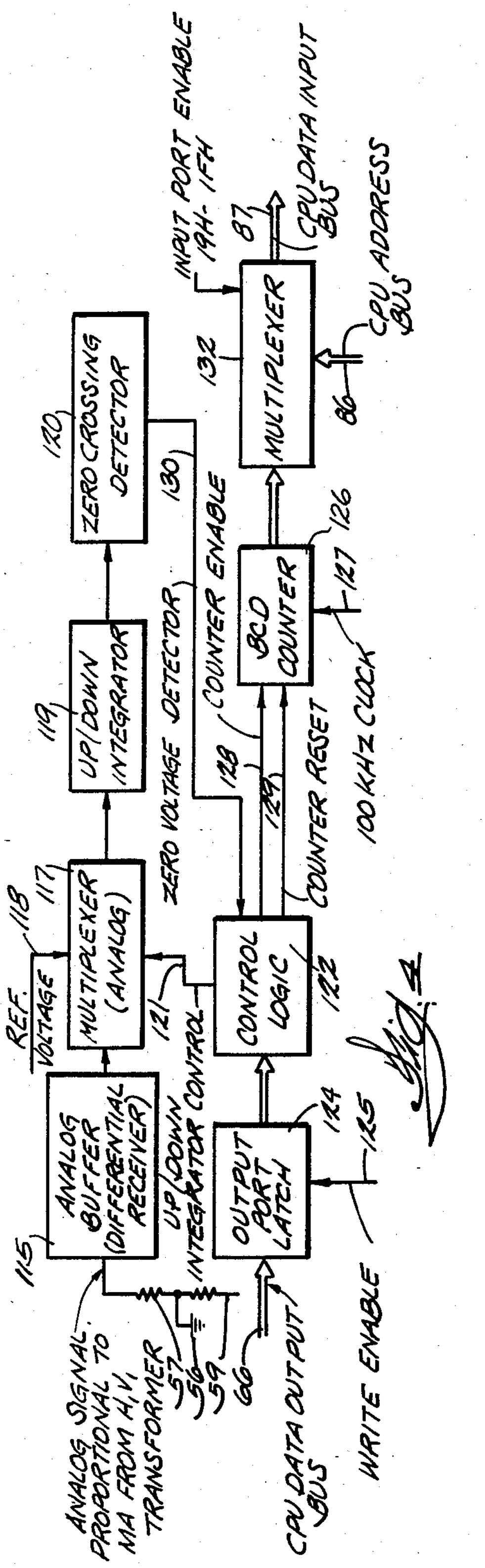
FIG. 4 is an expanded diagram of an analog-to-digital converter (ADC) which is shown in block form in FIG. 1.
Figure 5:
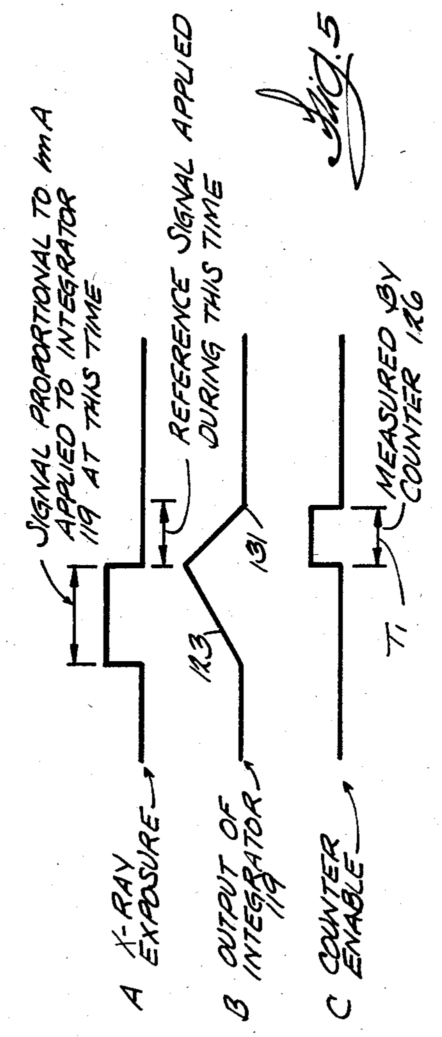
FIG. 5 comprised of parts A, B and C is a timing diagram for explaining the operation of the ADC in FIG. 4.
Figure 2:
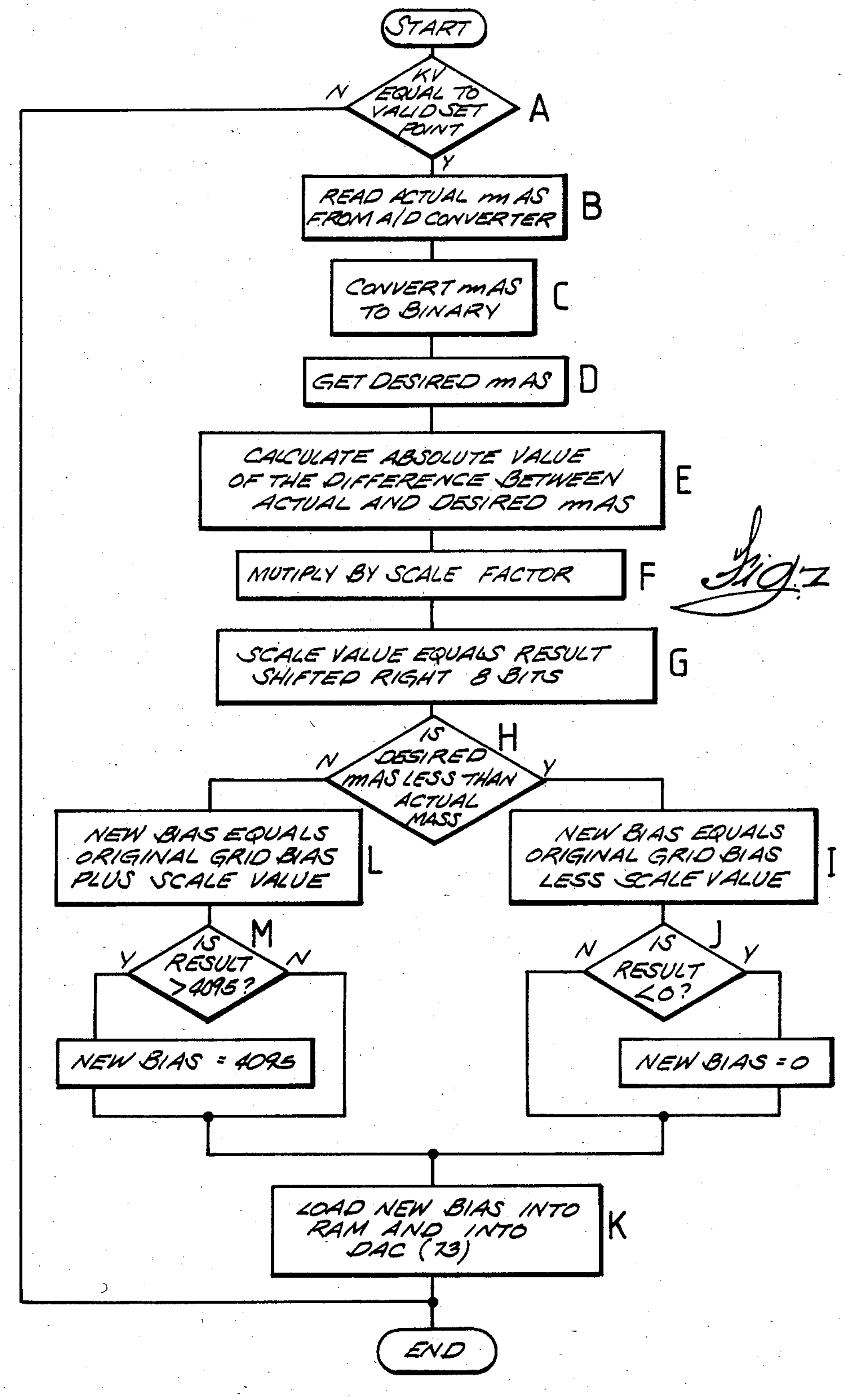

In FIG. 4 the analog signal that is proportional to x-ray tube current flowing through resistor 57 in FIG. 1 during the trials for the proper grid bias voltage to yield a selected tube mA with the higher anode kV appears at the input of an analog buffer 115 which is actually a differential receiver that rejects common mode noise. The output of buffer 115 connects to one input of an analog multiplexer 117. A reference voltage signal is supplied to the other input 118 of the multiplexer. The signal proportional to x-ray tube mA is depicted as waveform A in FIG. 5. The output of multiplexer 117 in FIG. 4 is coupled to an input of an up-down integrator 119 and the output of the integrator is coupled to the input of a zero-crossing detector 120. A control line 121 runs from a control logic circuit 122 to multiplexer 117. This control line is switched from one logical level to another to select one of the two input voltages to the multiplexer, either the reference voltage or the signal proportional to mA. The output signal of integrator 119 ramps up until the exposure terminates at which time the integrated voltage corresponds to the milliampere-seconds (mAS) during the exposure. The advantage of integration over the entire exposure pulses as opposed to a fixed sample time as in prior art integrators is better accuracy since the mA waveform being integrated is not a perfect square wave. Waveform B in FIG. 5 shows the up ramp 123.

The control signals in FIG. 4 are supplied from CPU data output bus 66 to an output port latch 124 in which control signals are written in response to write enable signals from the CPU on "write enable" signal input 125. There is a binary coded decimal (BCD) counter 126 in FIG. 4 and in the actual apparatus a 6 digit BCD counter 126 is used. It has a 100 kHz clock signal input line 127 as shown. It also has a counter enable signal input 128 and a counter reset signal input 129 leading from control logic circuit 122. A line 130 runs from the zero crossing detector 120 to the control logic 122 for providing a signal to the latter indicative of a zero crossing having occurred. In order to digitize the analog signal that is proportional to mAS, the CPU commands the integrator to integrate down by gating the fixed reference voltage through analog multiplexer 117. The reference voltage has a polarity opposite to the analog signal that is proportional to mAS. At the same time, the CPU enables counter 126 to start counting pulses from the 100 kHz clock. The counter gate signal is shown as waveform C in FIG. 5. The integrator 119 then ramps down until it reaches zero volts as at 131 in part B of FIG. 5. This is detected by zero-crossing detector 120. The control logic 122 responds by disabling counter 126. The digital count in counter 126 is then proportional to mAS during a trial exposure. This count is read out by the CPU two digits at a time through a digital multiplexer 132 in FIG. 4. Multiplexer 132 is addressed from CPU address bus 86 as shown. The digital number representing mAS is received by the CPU by way of its data input bus 87 as shown in FIG. 4. The CPU now, as previously described, determines if the measured mAS, just described, is equal to, or above or below the aforementioned 10 mAS desired exposure level and calculates the new trial bias voltage value in terms of a 12-bit digital number that will make the measured mAS and desired mAS agree or at least get closer. This new trial value is input to grid bias DAC 73 in FIG. 1 for controlling bias voltage generator 71 to produce the modified bias voltage. When after one or more trials, the desired and measured x-ray tube mAS agree, the 12-bit digital number representing the correct bias voltage for the selected mAS at the higher tube kV is stored in battery backed-up RAM 89 as previously explained.

As indicated earlier, after the service person develops the grid bias voltage versus x-ray tube current model for the particular x-ray tube at hand and stores the model date in RAM 89, the x-ray apparatus can be turned over to the users for performing regular fluography, radiography, ordinary digital subtraction angiography or hybrid digital subtraction angiography. However, after the model is formed, ADC 104 is disabled insofar as the user of the system is concerned, so that no data can be entered into RAM 89 which would erase or supplant the model.

Having a model relative to a particular x-ray tube is, as previously indicated, highly valuable in x-ray systems that are adapted to performing hybrid digital subtraction angiography since it is very important to have an accurate relationship between the x-ray tube current that is selected by the user and the current that actually flows through the tube.

Figure 6:
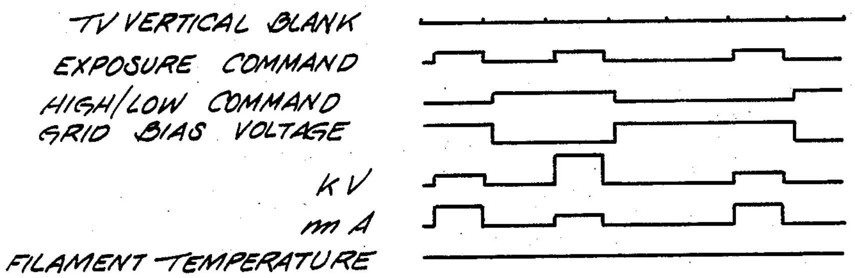
FIG. 6 is a diagram for explaining the timing of events that occur during execution of a hybrid digital angiography procedure.

After the system has been turned over to the end user, any sequence of high and low energy x-ray exposures for a hybrid procedure requires that low and high energy images be read out of the television camera in proper time relationship with the application of the high and low kilovoltages to the x-ray tube. Thus, FIG. 1 illustrates that there is a known type of image system controller 19 that is coupled to the television system by way of lines 116. Most of the system functions are referenced to the vertical blanking signals of television camera 17. When conducting a hybrid procedure, for example, where closely successive low and high energy exposures are made, time must be allowed after each exposure to read out the television camera target in the progressive scanning mode where one television frame time has to be allowed for reading out each exposure and allowing time for storing the digital pixel data representative of one image before another image may be made. A typical timing sequence for performing HDSA is shown in FIG. 6. Note that in the end user mode, the exposure command signal is controlled by the image signal processing circuits 19 by way of line 140 which circuits have the sync signals for the TV camera 17. The high/low command signal is controlled by the image signal processing circuits 19 by way of line 141. The uppermost waveform shows how the TV vertical blanking pulses occur periodically. Typically, the time between pulses will be 33 ms. The next line shows the exposure command signal which is provided by the exposure logic circuit 97 on line 101 in FIG. 1. Each low kv-high mA (low energy) and high kV-low mA (high energy) is initiated with an exposure command pulse on line 101 and is terminated by exposure timer 102. As can be seen in FIG. 6, when the first exposure command signal occurs, the x-ray tube is operating in the low kV and high mA mode. After the first exposure in a pair, there is a command for the stepup transformer to switch to its high kilovoltage output state and at the same time the grid bias voltage is made more negative so that on the ensuing high energy or high kV exposure, the x-ray tube will conduct lower mA. One or more vertical blanking periods may elapse before the next low energy and high energy pair of exposures is made. The user can be assured that the proper low mA will flow through the x-ray tube when the high kilovoltage is applied since the model data that has been stored in RAM 89 will assure the user that the proper grid bias voltage is being applied to get the desired mA at high kilovoltage. Note in FIG. 6 that the filament temperature and, hence, its emissivity remains constant for any exposure sequence.

The illustrative bias voltage model development procedure discussed heretofore assumed that the x-ray system was to be used for hybrid digital subtraction angiography in which case bias voltages data for obtaining specific tube currents at a single high kV, such as 130 kV, were determined and stored. It should be evident that the procedure and the same circuit components could be used for determining and storing the bias voltages data that should be applied to obtain a specific x-ray tube mA for a specific high or low kV where the anode kV is the variable. The service person would only have to select the mA desired at a particular kV and make trial exposures at that kV so that the bias voltage could be adjusted and stored to assure that in the user mode when a particular kV is selected, the stored bias voltage would be applied that causes the corresponding current or mA to flow through the tube.

I claim:

1. A method of making and storing a model of the grid bias voltages that must be applied to the control grid of an x-ray tube relative to the filament of the tube to obtain selected x-ray tube currents (mA) through the tube when x-ray exposures of a patient are made later with predetermined kilovoltage kV applied to the anode of the tube and with the filament current of the tube held constant, comprising the stops of:

storing a plurality of digital values representative of trial bias voltages in respective locations in a digital memory at addresses corresponding to desired x-ray tube mA values, having a programmed digital processor, as a first step in a cycle, access a trial bias voltage digital value at an address corresponding to a selected mA and convert said value to a corresponding analog signal, using the analog signal to control a bias voltage generator that responds to said signal by applying a corresponding negative bias voltage to said x-ray tube control grid relative to said filament, having the digital processor calculate the exposure time interval for making an x-ray exposure that yields a predetermined desire milliampere-second (mAS) x-ray dosage, setting an exposure timer for terminating the ensuing exposure at the end of the calculated time interval after the exposure has been initiated by applying said kV to the anode of the tube, displaying the actual mAS resulting from the exposure and of there is significant difference between the actual and desired mAS have the processor determine the magnitude of the difference and whether it is above or below the desired mAS and calculate a new trial bias voltage that will cause the bias voltage generator to produce a grid bias voltage that will result in a smaller or no significant difference between the actual and desired mAS when the next exposure is made, repeating the foregoing cylce, if necessary, until there is no significant difference between actual and desired mAS and then storing the final calculated digital representation of the bias voltage in the memory location at an address corresponding to said selected mA, selecting other mA values and repeating the steps for determining and storing the bias voltage value to obtain the desired mAS, to develop and store a model of bias voltage verses x-ray tube mA at a predetermined anode kV, and then inhibit input to said memory of digital data that would alter the stored bias voltage values.

2. The method set fourth in claim 1 and additionally using said model to make actual x-ray exposures of anatomy using any of the several mA values within the range of the mA values that correspond to the bias voltages stored in said memory, comprising the steps of:

having the user communicate to said processor the x-ray tube mA desired for a contemplated x-ray exposure with the predetermined kV applied to said x-ray tube anode, and having the processor programmed to address the memory location in which the bias voltage value corresponding to said desired mA is stored and if the exact desired value is not stored have the processor interpolate to determine the bias voltage necessary to produce the desired mA and in either case have the corresponding data representative of the required bias voltage ready for being supplied to said grid bias voltage generator when said exposure is initiated by applying said kV to the anode of said x-ray tube anode.

3. The method according to claim 2 including making alternating low and high energy x-ray exposures in rapid succession by performing the steps of:

applying the higher of two kilovoltages to said anode while the stored bias voltage corresponding to the selected mA is applied to the control grid of said tube for the high energy exposures, and alternately, applying the lower of said two kilovoltages to said anode and at the same time maintaining a substantially zero bias voltage on said control grid and maintaining said filament current and, hence, the filament temperature constant so that the x-ray tube mA for the lower energy exposures will be determined by the lower kV and the filament temperature rather than the grid bias voltage.

4. X-ray apparatus comprising an x-ray tube having an anode, a cathode filament and a control grid; a power supplying including a stepup transformer; rectifier means having its ac input terminals connected to the secondary windings of said transformer and a circuit for connecting its positive dc output terminal to said anode and its negative terminal to said filament, said circuit including resistor means for producing an analog signal proportional to the current flowing through said tube; means for controlling filament current and, hence, the temperature and emissivity of the filament; bias voltage generator means having one output terminal connected to said filament and another output terminal connected to said control grid for applying a negative voltage to the grid with respect to the filament, said generator means responding to input of an analog signal representative of bias voltage by producing a corresponding bias voltage on its output terminals; switch means operable to energize and deenergize said transformer, and means for determining a model of the bias voltages that must be applied to the x-ray tube grid to have corresponding predetermined currents flow through the tube, comprising:

digital processor means and data input and output bus means coupled to said digital processor means, digital memory means coupled to the bus means and having a plurality of locations for storing digital value respectively representative of bias voltages, a grid bias digital-to-analog converter (DAC) having a digital value input coupled to the bus means and an analog signal output coupled to said bias voltage generator means for controllign said generator means to apply to said control grid a negative bias voltage corresponding to the input digital value and the analog output signal, analog-to-digital converter (ADC) means having an input for said analog signal proportional to x-ray tube current (mA) and an output for corresponding analog signals coupled to said bus means, an x-ray exposure interval timer having an input for timing signals representative of the intervals and an output coupled to said switch means, said switch means responding to the timer output being in one or another state by energizing and deenergizing said transformer, respectively, means for commanding said timer to simultaneously initiate measuring the exposure time interval and switch its output to the one state for energizing said transformer and starting the exposure and said timer switching to said other state at expiration of the interval, means for supplying to said digtal processor means data representative of the mA it is desired to have flow through said x-ray tube when one of various kilovoltage is applied to the x-ray tube anode and said filament current is constant, said digital processor means being programmed to respond to said data by transferring a trial digital bias voltage stored in a location in said memory having an address corresponding to said mA to said DAC for conversion to an analog signal that is fed to said bias voltage generator for producing a corresponding grid bias voltage, said digital processor means being programmed to calculate the exposure time interval required to yield a predetermined desired milliampere-second (mAS) x-ray exposure at said mA and said digital processor means effecting the transfer of data representative of said time interval to said exposure timer, conduction of current by said x-ray tube during the exposure resulting in said ADC means providing a digital signal representative of the mA level to said digital processor means and said digital processor means being programmed to use the mA and exposure time interval to calculate teh actual mAS during the exposure and programmed to calculate and store in said same memory location a new bias voltage which should result in reducing the difference, if any, between the desire mAS and actual mAS during the next exposure and when a final exposure is made wherein the actual and desired mAS substantially agree said final bias voltage value is stored in said location from which said trial bias voltage value was transferred, means for displaying said mAS values during the exposures, and addressing said memory means with additional mA values and repeating said bias voltage determining exposures resulting in a said memory containing a model of grid bias voltages versus x-ray tube mA for use in making actual x-ray exposures of a body at tube mA values selected by the user.

5. The apparatus according to claim 4 including battery backup means coupled to said memory means for supplying electric power to said memory means to preserve the bias voltage model stored in said memory means when supply from any other power source is lost.

6. The apparatus according to claim 4 wherein said ADC means comprises:

a differential receiver having an input for said signal proportional to x-ray tube current, and an output for said signal, ananalog multiplexer having an input for said proportioned signal and an input for a reference voltage signal and having an output to which said proportioned and reference voltage signals are selectively switched in response to a control signal to said multiplexer, an up/down integrator having an input coupled to the output of said multiplexer and having an output, control logic means for providing control signals that cause said multiplexer to apply said proportional signal to said integrator during the entire exposure interval so that said integrator will ramp up to a voltage level corresponding to the mAS during the exposure interval and to apply said reference signal of opposite polarity to said integrator when said exposure ends to cause the previously integrated voltage signal to ramp down to zero, a zero crossing detector coupled to the integrator for detecting said zero and for providing a signal when zero is detected, and a digital counter having an input for a clock pulse train and an output for a digital count value, said control logic means providing signals coupled to the counter which cause the counter to count pulses during the ramp down time until said zero is detected to thereby produce a digital value that corresponds to mAS for being coupled to said bus means.

7. The apparatus according to claim 4 wherein:

said power supply includes first and second autotransformers for supplying nominally low and high voltages alternately to the primary of said stepup transformer, first and second electronic switch means each responsive to input of a command signal by respectively connecting the first and second autotransformers to said primay to thereby apply alternate low and high kilovoltages to said x-ray tube anode for making high and low energy x-ray exposures, an x-ray image intensifier and television means, including signal processing means, for converting optical versions of alternate low and high energy images to signals representing said images, and for providing command signals corresponding to television frame times one of which signals is for commanding an exposure at each energy to start and the other signal is for commanding a low or high energy exposure, exposure logic circuitry means having input means for said command signals and having output means coupled respectively to said electronic switches and to said exposure timer, said logic circuitry being operative in response to input of low and high command signals from said signal processing means by input of corresponding signals to said first and second electronic switch means and said exposure logic circuitry being operative in response to input of said expsoure command signal by providing a corresponding signal to said exposure timer for initiating the respective exposure time intervals and to said digital processor means, means for the operator to provide a signal to said processor indicative of the x-ray tube mA desired during the low energy exposures, means controlled by said digital processor means for controlling the x-ray tube filament current and emissivity that will result in said desired mA during low energy expsures, and said digital processor means using said desired mA to address the location in said memory that stores the model grid bias voltage value that will result in the tube mA when the high kilovoltage is applied that was the determined mA when the model was made and transferring said value to said grid bias DAC for developing said bias voltage each time said high kilovoltage is applied to said x-ray tube anode during the alternate low and high energy exposure sequence.

* * * * *